United States Patent [19]
Lohr

[11] 3,734,478
[45] May 22, 1973

[54] HYDROPNEUMATIC SHOCK ABSORBING ARRANGEMENT FOR AUTOMOTIVE VEHICLES OR THE LIKE

[75] Inventor: Manfred Lohr, 5868 Letmathe, Germany

[73] Assignee: Hoesch Aktiengesellschaft, Dortmund, Germany

[22] Filed: June 11, 1971

[21] Appl. No.: 152,268

[30] Foreign Application Priority Data
June 13, 1970 Germany.....................P 21 22 651.7
June 13, 1970 Germany.....................P 20 29 351.0

[52] U.S. Cl......................................267/34, 267/64 R
[51] Int. Cl.............................................B60g 11/56
[58] Field of Search...................................267/64, 34

[56] References Cited
UNITED STATES PATENTS
3,549,168  12/1970  Swanson.................................267/64
3,582,106  6/1971  Keijzer...................................267/64 B

FOREIGN PATENTS OR APPLICATIONS
1,298,412  5/1960  France...................................267/64

Primary Examiner—James B. Marbert
Attorney—Michael S. Striker

[57] ABSTRACT

A shock absorbing arrangement for use in automotive vehicles has several self-levelling hydropneumatic struts, a pump and an accumulator for pressurized hydraulic fluid, a tank for hydraulic fluid, and two mechanically operating delay units the first of which delays the expansion of struts to their normal length and the second of which delays the contraction of struts to their normal length. The first delay unit is installed in a conduit which connects the pump and the accumulator with inlets provided in the piston rods of the struts and the second delay unit is installed in a conduit which connects the outlets of the struts with the tank.

22 Claims, 10 Drawing Figures

INVENTOR
Manfred LÖHR

INVENTOR
Manfred LÖHR

By his ATTORNEY

HYDROPNEUMATIC SHOCK ABSORBING ARRANGEMENT FOR AUTOMOTIVE VEHICLES OR THE LIKE

BACKGROUND OF THE INVENTION

The present invention relates to shock absorbing apparatus in general, and more particularly to improvements in shock absorbing arrangements for use in automotive vehicles or the like. Still more particularly, the invention relates to improvements in hydropneumatic shock absorbing arrangements which are especially suited for use in automotive vehicles and comprise one or more self-levelling shock absorbers or struts wherein a portion is movable from a neutral position to one of a plurality of first positions to thereby shorten the strut and from such neutral position to one of a plurality of second positions to thereby lengthen the strut.

It is already known to provide a hydropneumatic shock absorbing arrangement for use in automotive vehicles with one or more flow restrictors which delay the lengthening of one or more struts to their normal length or the shortening of one or more struts to their normal length. Such lengthening and shortening of struts can take place in response to dynamic load changes, especially while the vehicle travels along a curve whereby the struts which are associated with the outer wheels become shorter and the struts which are associated with the inner wheels become longer. The delayed return of struts to their normal length is desirable for the sake of safety, i.e., the shortened strut or struts should receive a pressurized fluid medium with a certain delay following such shortening and the lengthened strut or struts should be permitted to discharge some fluid and to thus reduce their length to normal length with a certain delay following the elongation. If the struts are mounted between the chassis and the wheel axles of the vehicle, a lengthening of the struts results in an increased distance between the point of attachment to the chassis and the respective axle and the shortening of struts results in a reduction of such distance.

German printed publication (DAS) No. 1,555,436 discloses a hydropneumatic shock absorbing arrangement wherein the flow of hydraulic fluid is throttled during movement of the parts of struts to their neutral positions. The arrangement is assembled in such a way that the termination of adjustment in a direction to lengthen the strut is followed by an interval in which no regulation takes place and such interval is followed by an adjustment to reduce the length of the strut. A drawback of such arrangements is that, when the vehicle travels in a curve and its frame becomes inclined or tilted beyond the normal extent, the strut or struts which are located at the outer side of the vehicle become longer and the struts at the inner side become shorter. If the vehicle is thereupon immediately driven into a second curve of opposite curvature, the frame remains in an excessively inclined position with the attendant danger of overturning. Another drawback of the just described arrangement is that tee flow restricting devices become operative when the vehicle is driven on bad roads as well as during acceleration or during braking of the vehicle. This involves the starting of an electric motor for the pump which furnishes pressurized hydraulic fluid with attendant wear upon such parts. Alternatively, the fluid pressurizing unit of the shock absorbing arrangement must employ a very large accumulator for pressurized hydraulic fluid.

It is also known to construct a hydropneumatic shock absorbing arrangement for use in automotive vehicles in such a way that the hydraulic fluid is circulated at all times, i.e., the throttling of the fluid flow is regulated in such a way that, when the strut or struts assume their normal positions, there develops a stationary condition close to the neutral position of the struts. Such arrangement is disclosed in German printed publication (DAS) No. 1,150,584; its drawback is that the pump which circulates the hydraulic fluid must remain in operation at all times with attendant excessive wear and excessive energy requirements.

German printed publication (DAS) No. 1,292,013, discloses an arrangement wherein the flow of hydraulic fluid is not throttled; instead, the struts are connected in series with a damping unit. A drawback of this proposal is that, in order to achieve the desirable delay, the damping action must be so pronounced that, when the vehicle vibrates close to such positions which necessitate an adjustment of the struts and thereupon returns to its normal position for a short interval of time, the damping piston does not return to its normal position and brings about an undesirable regulating action. Another drawback of such arrangements is that the delay becomes shorter in response to increasing tilting of the vehicle frame.

SUMMARY OF THE INVENTION

An object of the invention is to provide a novel and improved shock absorbing arrangement for use in automotive vehicles which employs one or more preferably hydropneumatic self-levelling shock absorbers or struts and to provide such arrangement with novel and improved delay devices which determine the delay with which an extended strut can return to its neutral position as well as the delay with which a shortened strut returns to its neutral position.

Another object of the invention is to provide the shock absorbing arrangement with novel and improved mechanically operating delay units which determine the delay with which one or more struts return to their neutral positions either from any one of several first or contracted positions or from any one of several second or extended positions.

A further object of the invention is to provide a shock absorbing arrangement wherein the delay with which the movable parts of one or more struts reassume their neutral positions increases in response to more pronounced inclination of the vehicle frame.

An additional object of the invention is to provide a shock absorbing arrangement which can employ two identically constructed delay units, one for delaying the movements of the movable parts of one or more struts from contracted positions to normal or neutral positions and the other for delaying the movements of movable parts in one or more struts from extended positions to neutral positions.

Still another object of the invention is to provide an arrangement wherein the delay which is brought about by the delay units is fully effective even if the strut or struts return to their normal positions for a short interval of time.

The invention is embodied in a shock absorbing arrangement, particularly in a hydropneumatic arrangement which is especially suited for use in automotive vehicles, which comprises a tank or an analogous source of hydraulic fluid (such as oil), pressurizing means which preferably comprises a pump driven by an electric motor and at least one accumulator for pressurized hydraulic fluid and is arranged to withdraw fluid from the source and to pressurized the thus withdrawn fluid, at least one self-levelling (preferably hydropneumatic) strut having a piston rod or another movable portion which is movable from a neutral position to several first and second positions to thereby respectively reduce and increase the length of the strut, first and second conduit means for respectively conveying pressurized fluid from the pressurizing means to an inlet of the strut and for conveying fluid from an outlet of the strut into the source whereby the admission of pressurized fluid to the inlet results in a lengthening and the evacuation of fluid by way of the outlet results in a shortening of the strut, and first and second mechanically operating delay units which are respectively installed in the first and second conduit means. The first delay unit is operative to determine the delay with which the movable portion of the strut returns to its neutral position from one of the first positions by controlling the flow of pressurized fluid from the pressurizing means to the inlet of the strut, and the second delay unit determines the delay with which the movable portion of the strut returns to its neutral position from one of the second positions by controlling the flow of fluid from the outlet of the strut to the source by way of the second conduit means.

The two delay units preferably are but need not be of identical design.

The delay which is brought about by the aforementioned delay units is that interval of time which elapses between the movement of a level scanning device or of the movable part of a strut to one of the first or second positions and the start of adjustment in the length of the strut, either to increase its length (first delay unit) or to reduce its length (second delay unit). No change in the length of the strut should take place during such interval.

The novel features which are considered as characteristic of the invention are set forth in particular in the appended claims. The improved shock absorbing arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
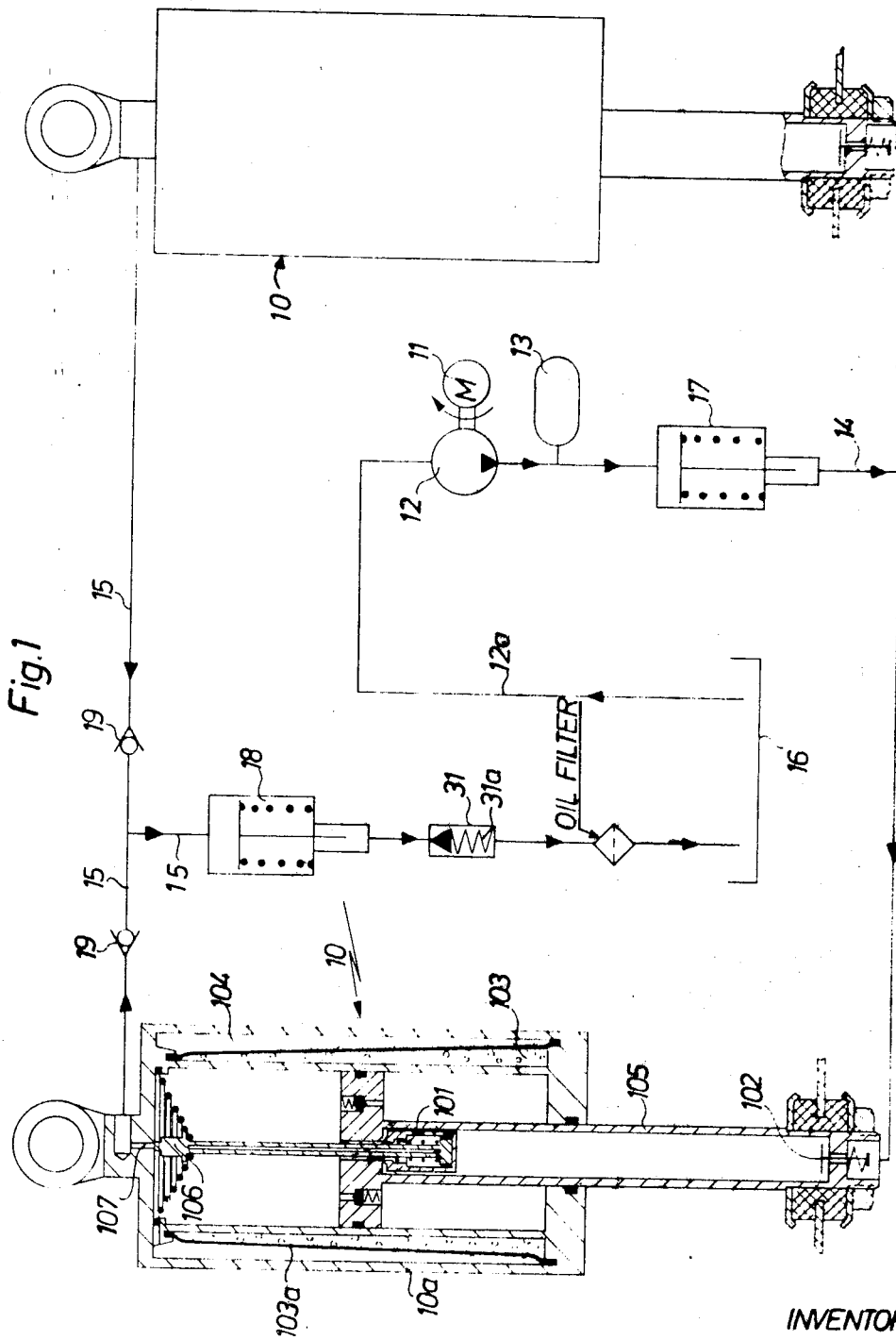
FIG. 1 is a diagrammatic partly elevational and partly sectional view of a hydropneumatic shock absorbing arrangement with two self-levelling hydropneumatic struts which embodies one form of the invention.

Referring first to FIG. 1, there is shown a hydropneumatic cushioning or shock absorbing arrangement for use in automotive vehicles. The arrangements comprises two discrete self-levelling shock absorbers or struts 10, a pressurizing device for oil or another suitable hydraulic fluid including a pump 12 driven by an electric motor 11 and a pressure tank 13 (e.g., a diaphragm or bladder accumulator), a first or high-pressure conduit 14 which connects the inlets of struts 10 with the pressure side of the pump 12 and with the accumulator 13, a second or return conduit 15 which delivers hydraulic fluid from the outlets of struts 10 to source or tank 16 from which the pump 12 draws fluid by way of a supply conduit 12a, and two mechanically operating delay units 17, 18 which are respectively installed in the conduits 14 and 15. The delay unit 17 serves to effect a delayed admission of pressurized hydraulic fluid to the inlets of the struts 10, and the delay unit 18 serves to effect a delayed return flow of fluid from the outlets of the struts 10 into the source or tank 16. One-way check valves 19 are installed in the return conduit 15 to permit the flow of fluid only in a direction from the outlets of the struts 10 toward the delay unit 18.

Figure 2:
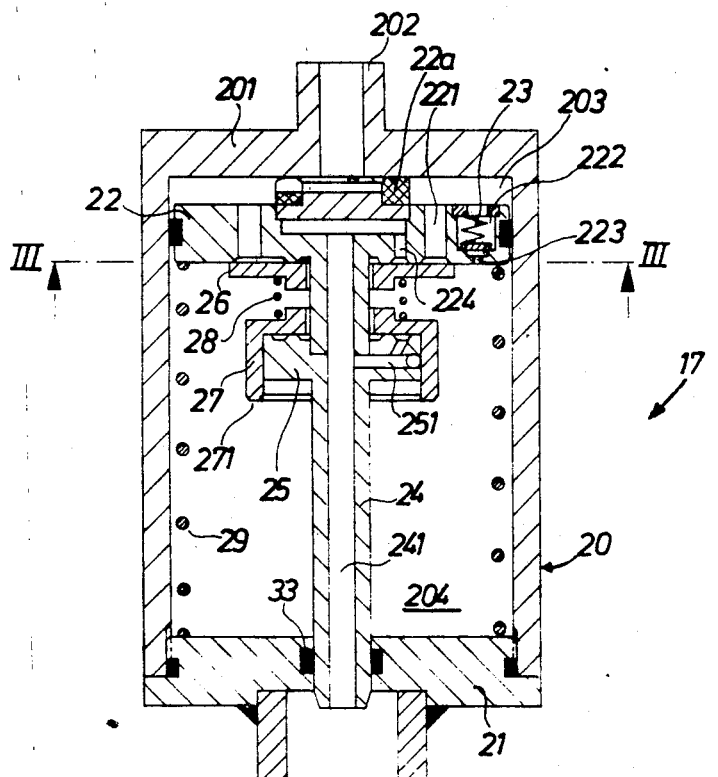
FIG. 2 is an enlarged axial sectional view of one of the two mechanical delay units shown in FIG. 1, the piston and piston rod of the illustrated delay unit being shown in a first end position.
Figure 3:
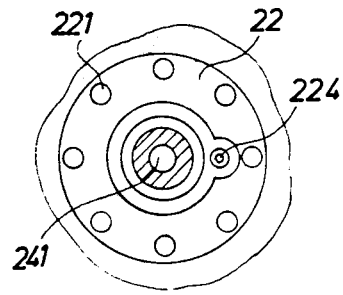
FIG. 3 is a fragmentary transverse sectional view as seen in the direction of arrows from the line III—III of FIG. 2
Figure 4:
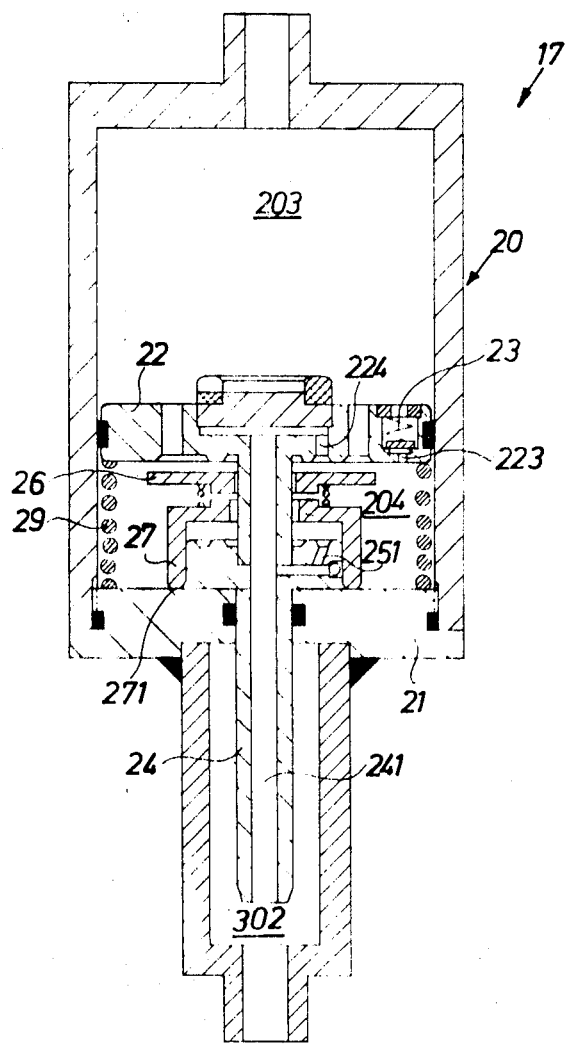
FIG. 4 illustrates the structure of FIG. 2 but with the piston and piston rod in a different end position.

The construction of the delay unit 17 (which is preferably identical with the delay unit 18) is shown in FIGS. 2 to 4. This delay unit comprises a cylinder 20 which has a bottom wall or end wall 201 at one axial end and a removable cover 21 at the other end. The central portion of the end wall 201 is provided with a nipple 202 defining a bore which communicates with the accumulator 13 and with the outlet of the pump 12. A piston 22 which is reciprocable in the cylinder 20 is rigidly connected with an elongated hollow piston rod 24. The piston 22 divides the interior of the cylinder 20 into two chambers 203, 204 and is provided with an annulus of axially parallel bores 221 through which the hydraulic fluid can flow between the chambers 203, 204 in the open position of a disk-shaped valve plate 26 installed in the chamber 204. The piston 22 is further provided with a passage 222 which can permit the flow of hydraulic fluid between the chambers 203, 204 in response to opening of a spring-biased one-way valve 23. That end portion 223 of the passage 222 which is in direct communication with the chamber 204 constitutes a flow restrictor. The one-way valve 23 prevents the flow of hydraulic fluid from the chamber 203 into the chamber 204 but opens automatically when the pressure of fluid in the chamber 204 exceeds the pressure of fluid in the chamber 203. The one-way valve 23 can be omitted (see FIGS. 7-9) and the passage 222 with the flow restrictor 223 can be replaced with a flow restricting passage of constant diameter (see the passage 414b in FIG. 7).

The piston rod 24 has an axial bore 241 which communicates with an auxiliary chamber or compartment 302 provided in a cylindrical extension 30 of the cover 21. The outer (lower) end of the extension 30 has a hollow nipple 301 by way of which the compartment 302 communicates with the conduit 14. The piston rod 24 is provided or connected with a valve body 25 which is located in the chamber 204 and is normally surrounded by a cupped or bell-shaped valve member 27. The valve plate 26 is biased against the piston 22 to assume a sealing position, in which it seals the respective ends of the bores 221, by a helical spring 28 which reacts against the valve member 27 so that the latter completely surrounds the valve body 25 when its end face 271 is remote from the cover 21. A prestressed helical spring 29 reacts against the cover 21 and biases the piston 22 upwardly, as viewed in FIG. 2, so that a sealing ring 22a of the piston 22 normally seals the chamber 203 from the pump 12 and accumulator 13.

The axial bore 241 of the piston rod 204 communicates with a port 224 of the piston 22; this port is sealed when the valve plate 26 assumes the sealing position of FIG. 2. Furthermore, the axial bore 241 communicates with a port 251 in the valve body 25. The cover 21 contains a sealing element 33 for the piston rod 24; the sealing element 33 seals the chamber 204 from the compartment 302. When the valve plate 26 is lifted off the respective side of the piston 22 to assume its open position, the fluid can flow from the chamber 203 into the chamber 204 by way of the axially parallel bores 221. At the same time, hydraulic fluid can flow through the port 224 and the axial bore 241 of the piston rod 24 to enter the compartment 302 of the extension 30. When the valve member 27 dwells in the sealing position shown in FIG. 2, it seals the port 251. If the piston 22 is caused to move downwardly, as viewed in FIG. 2, in order to move the end face 271 into abutment with the cover 21 while the valve body 25 continues to move toward the extension 30, the valve member 27 assumes its open position and permits the port 251 to communicate with the chamber 204. It will be noted that the axial length of the cylindrical portion of the valve member 27 exceeds the axial length of the valve body 25. The fluid is then free to flow from the chamber 204, through the port 251 and bore 241, and into the compartment 302.

Each of the struts 10 is somewhat similar to the strut shown and claimed in my U.S. Pat. No. 3,547,465 patented Dec. 15, 1970. When the piston rod 105 (see FIG. 1) of at least one of the struts 10 penetrates into the respective housing 10a, the delay unit 17 delays the outward movement of the respective piston rod 105. Such movement of the piston rod 105 brings about a drop of fluid pressure in the conduit 14 and hence in the compartment 302 of the extension 30 in the delay unit 17. The drop of fluid pressure in the conduit 14 is due to opening of a regulating valve 101 in the respective strut 10 and to opening of a one-way check valve 102 provided in the fluid-admitting inlet of the piston rod 105 (see FIG. 1). The check valve 102 controls a throttling inlet orifice in the lower end portion of the piston rod 105, as viewed in FIG. 1. The fluid pressure in the conduit 14 then equals the pressure of a compressed gaseous fluid in a plenum chamber 103 of the respective strut 10, i.e., of that strut wherein the piston rod 105 has penetrated into the corresponding housing 10a.

The pressure of hydraulic fluid in the accumulator 13 invariably exceeds the pressure of gas in the plenum chamber 103 when the piston rod 105 assumes its neutral position. When the pressure in the conduit 14 decreases to match the pressure in the plenum chamber 103 of the shortened strut 10, the pressure in the chamber 203 of the delay unit 17 exceeds the pressure in the compartment 302 of the extension 30. Therefore, the piston 22 moves downwardly, as viewed in FIG. 1 or 2, to further stress the spring 29 and to compress the fluid in the chamber 204. The fluid in the chamber 204 opens the one-way valve 23 in the passage 222 of the piston 22 and flows from the chamber 204 into the chamber 203. The length of the interval which elapses before the piston rod 105 returns from one of its first positions (shortened strut) to its neutral position is determined by the ratio of the effective (upper) surface of the piston 22 in the chamber 203 to the cross-sectional area of the piston rod 24, by the characteristic of the spring 29, and/or the cross-sectional area of the flow restricting end portion 223 of the passage 222. When the piston 22 approaches the cover 21, the end face 271 of the valve member 27 engages the inner side of the cover while the valve body 25 continues to move toward the extension 30. The port 251 is then free to communicate with the chamber 204 (see FIG. 4). This starts the return movement of the depressed piston rod 105 to its neutral position in that the pressurized hydraulic fluid which is furnished by the pressure tank 13 flows into the chamber 203 by way of the nipple 202 (because the ring 22a of the piston 22 is remote from the end wall 201). The pressurized fluid in the chamber 203 moves the valve plate 26 to open position and enters the chamber 204 by way of the bores 221. From the chamber 204, the pressurized fluid flows through the ports 224, 251 into the axial bore 241 of the piston rod 24, thereupon into the compartment 302, conduit 14 and into the inlet of the respective strut 10. Such fluid opens the one-way valve 102 and flows into the liquid-filled working chamber 104 of the strut 10. The working chamber 104 is separated from the plenum chamber 103 by a flexible diaphragm 103a. As the volume of the working chamber 104 increases, the volume of the plenum chamber 103 decreases due to deformation of the diaphragm 103a so that the pressure of gas in the chamber 103 rises. Such pressure rise in the plenum chamber 103 causes an outward movement of the respective piston rod 105 (i.e., a downward movement of the piston rod 105 shown in FIG. 1) so that the overall length of the respective strut 10 increases. The outward movement of the piston rod 105 is terminated in response to closing of the aforementioned regulating valve 101 in the respective strut 10. This terminates the adjustment and the piston rod 105 thereupon dwells in its neutral position. In such neutral position of the piston rod 105, the fluid pressure in the compartment 302, conduit 14 and in the axial bores of the piston rods 105 equals the pressure of fluid in the accumulator 13. The spring 29 is free to expand and pushes the piston 22 upwardly, as viewed in FIG. 4, to thus reduce the fluid pressure in the chamber 204 of the delay unit 17. This causes the valve plate 26 to move away from the underside of the piston 22 and to permit pressurized fluid to flow from the chamber 203, through the bores 221 and into the chamber 204. Consequently, the fluid in the chamber 203 does not oppose an abrupt return movement of the piston 22 into the starting or idle position shown in FIG. 2 because, when the valve plate 26 is held in its open position, the fluid is free to flow through all of the bores 221 and thus offers a negligible resistance to movement of the piston 22 in a direction to reduce the volume of the chamber 203 while simultaneously increasing the volume of the chamber 204. As the piston 22 moves toward the end wall 201, the lower end portion of the piston rod 24 is being withdrawn drawn from the compartment 302 whereby the latter receives a corresponding quantity of fluid from the chamber 204 by way of the port 224 and the axial bore 241.

If the piston rod 105 of one or both struts 10 is moved inwardly for a relatively short period of time, the damped movement of the piston 22 in the cylinder 20 of the delay unit 17 toward the cover 21 takes place as long as the regulating valve or valves 101 of one or both struts 10 remain open. As soon as the valve or valves 101 close, the piston 22 rapidly returns to the starting position of FIG. 2 in a manner and for the reasons as described above.

The operation of the delay unit 18 is analogous to that of the delay unit 17. The unit 18 delays the inward movement of the piston rod or piston rods 105 of one or both struts 10 from their second positions to neutral positions. The nipple 202 of the end wall 201 of the cylinder 20 in the delay unit 18 communicates with the return conduit 15, and the nipple 301 of the extension 30 of the cover 21 in the delay unit 18 is in communication with the oil tank 16. When at least one of the piston rods 105 moves outwardly beyond the neutral position, a flow regulating pin 106 of the respective strut 10 moves away from the respective end of an outlet 107 which permits hydraulic fluid to flow into the respective branch of the return conduit 15 under the action of compressed gas in the respective plenum chamber 103 wherein the gas pressure invariably exceeds the pressure of oil in the tank 16. The piston 22 of the delay unit 18 then moves from the position corresponding the that shown in FIG. 2 to that shown in FIG. 4 so as to move the valve body 25 with reference to the valve member 27 and to permit hydraulic fluid to flow through the port 251. This starts the return (inward) movement of the piston rod 105 to its neutral position.

An important advantage of the arrangement shown in FIG. 1 is that it can automatically compensate for differences in the load upon the left-hand and right-hand sides of the chassis in an automotive vehicle. This is achieved by the provision of check valves 19 which prevent hydraulic fluid from flowing to the outlets 107 of the struts 10 by way of the return conduit 15.

When the struts 10 of the arrangement shown in FIG. 1 carry an average load, it is desirable that the delay produced by the unit 17 equal the delay produced by the unit 18, i.e., that the length of the interval which is required to move the piston 22 in the cylinder of the unit 17 to a position in which the port 251 is freed and at least one of the piston rods 105 can move outwardly to its neutral position should equal the length of the interval which is required to move the piston 22 of the unit 18 to a similar position to thereby start the inward movement of at least one piston rod 105 toward its neutral position. This is achieved by the provision of an auxiliary check valve 31 which is mounted in the conduit 15 between the tank 16 and the extension 30 of the cylinder cover 21 in the delay unit 18. The check valve 31 is preferably adjustable (i.e., its spring 31a can be subjected to a greater or lesser initial stress) so as to insure that the compartment 302 in the delay unit 18 can discharge fluid into the tank 16 when the pressure in the extension 30 of the unit 18 rises to a preselected value. It is equally possible to employ a check valve 31 which is not adjustable but is constructed in such a way that it opens in response to the aforementioned predetermined fluid pressure. In this way, one can properly balance the pressure difference between the pressure tank 13 and plenum chamber 103 on the one hand and the difference between the pressure in the plenum chamber 103 and the pressure in the compartment 302 of the delay unit 18 on the other hand.

When a vehicle which embodies the improved shock absorbing arrangement travels in a curve or on an uneven road, the delay units 17, 18 are not in operation. The same applies when the vehicle travels on uneven roads or on uneven terrain, during braking and/or during acceleration of the vehicle. It is important to note that the pistons 22 rapidly return to their normal or starting positions (FIG. 2) in response to short-lasting movement of piston rods 105 from their extended or contracted positions to neutral positions so that the respective delay unit 17 or 18 is again ready to furnish the full delay prior to start of a regulating operation, either by admitting pressurized fluid to the inlet of the respective piston rod 105 or by permitting fluid to flow from the outlet 107 of the respective housing 101a back into the tank 16.

The improved shock absorbing arrangement can employ four struts 10, one for each wheel of the vehicle. Such arrangement need not employ more than two delay units despite the fact that it embodies more than two struts. Another advantage of the improved arrangement is that the throughput of hydraulic fluid is less than in conventional arrangements of the type wherein the flow of fluid is throttled for the purpose of delaying the regulating operation upon extension or shortening of a strut; therefore, the arrangement of FIG. 1 can employ a relatively small accumulator 13 and the pump 12 must be operated at less frequent intervals and its motor 11 consume relatively small amounts of electrical energy. The pump 12 insures that the fluid pressure in the accumulator 13 remains within a predetermined range.

The delay units 17, 18 can be used with advantage in such types of shock absorbing arrangements which employ level detectors (The level detector is similar to the level detector shown and claimed in the British patent specification 1,224,046 published Mar. 3, 1971.) located without the struts. The delay furnished by the units 17, 18 increases in response to increasing inclination of the vehicle frame. This is due to rising pressure in the strut which is located at the outer side and to decreasing pressure in the strut which is located at the inner side of the curve.

Figure 5:
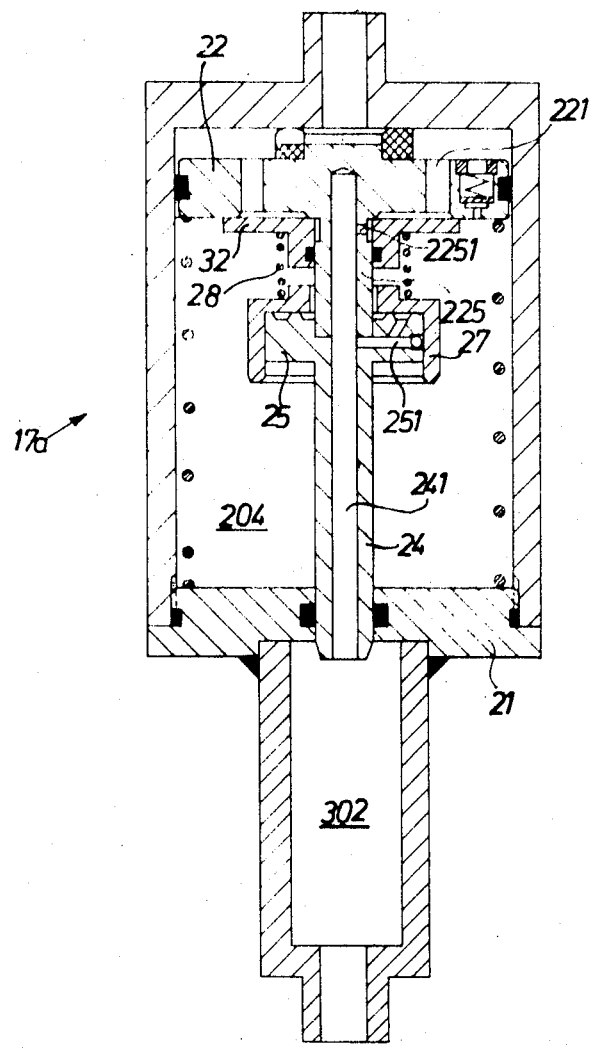
FIG. 5 is an axial sectional view of a delay unit which constitutes a modification of the delay unit shown in FIGS. 2–4.

The delay unit 17A of FIG. 5 can replace the delay unit 17 or 18 and comprises a modified valve plate 32 which is used as a substitute for the valve plate 26 of FIG. 2. The valve plate 32 can seal the lower ends of the axially parallel bores 221 in the piston 22. The port 2251 in a sleeve-like extension 225 of the piston 22 is sealed by the valve plate 32 from the chamber 204 when the chamber 204 is sealed from the bores 221. The port 2251 replaces the port 224 of FIG. 2 and serves to permit hydraulic fluid to flow between the bore 241 of the piston rod 24 and the chamber 204 when the valve plate 32 is moved to its open position. In FIG. 2, the port 224 is sealable by the upper side of the valve plate 26. A comparison of the structure shown in FIG. 2 with that shown in FIG. 5 will reveal that the fluid pressure in the compartment 302 exerts a lesser influence on the valve parts 32 of FIG. 5 so that the latter can be moved to its open position more rapidly than the valve plate 26. In other words, the cross-sectional area of that surface of the valve plate 32 which is acted upon by the pressure prevailing in the compartment 302 is less than the corresponding cross-sectional area of the valve plate 26. The upper side of the radially extending portion of the valve plate 32 can seal the bores 221 and the internal surface of the axially extending portion of the valve plate 32 can seal the port 2251.

Figure 6:
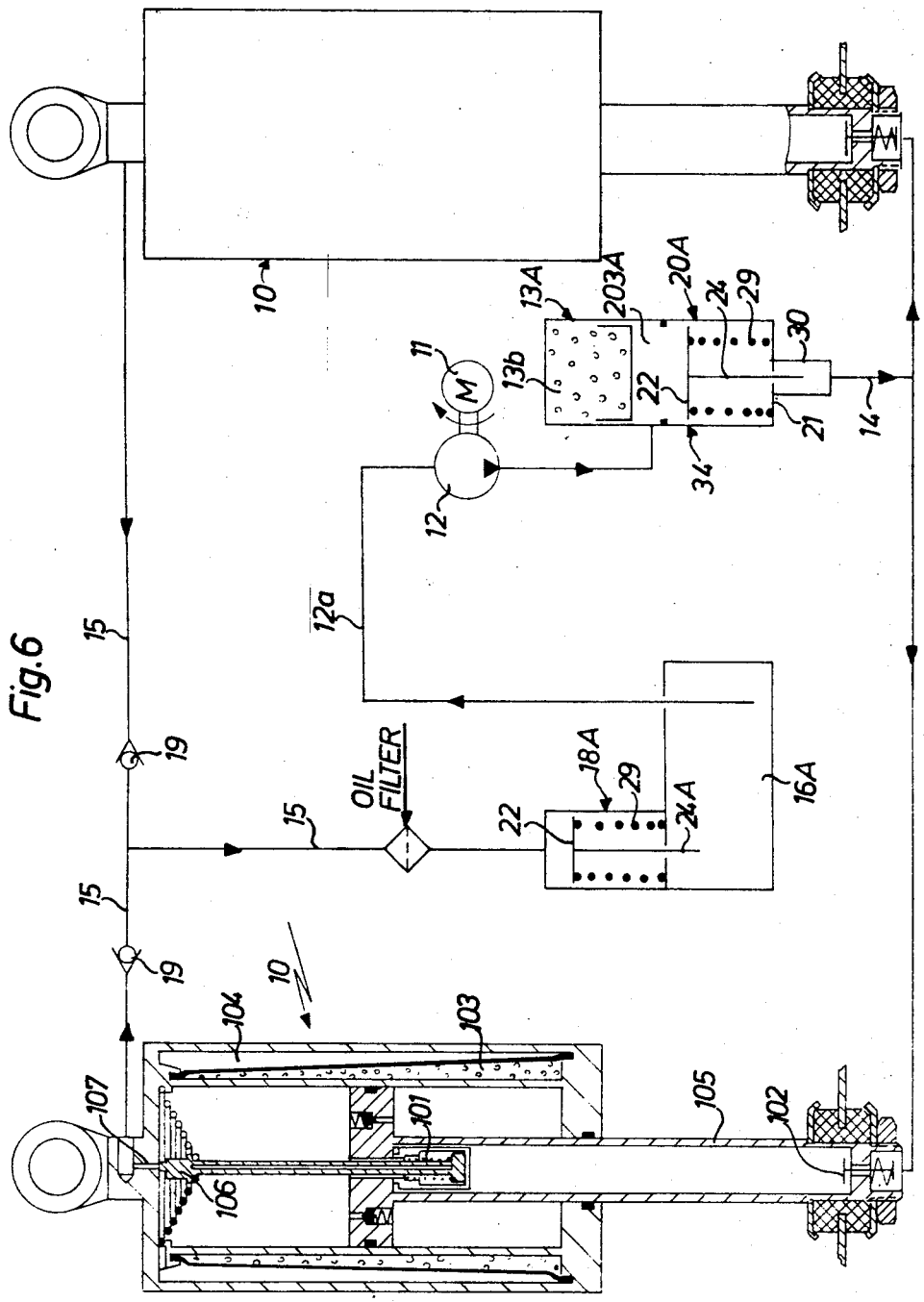
FIG. 6 is a diagrammatic partly elevational and partly sectional view of a modified shock absorbing arrangement wherein one of the delay units is mounted on the source of hydraulic fluid and the other delay unit is combined with an accumulator of the pressurizing means for hydraulic fluid.

FIG. 6 shows a modified arrangement wherein the delay unit 17 or 17A is replaced by a delay unit 34 having a built-in accumulator 13A. The delay unit 18 is replaced with a delay unit 18A which does not have an extension 30 and is mounted directly on the source or tank 16A. The piston rod 24A of the delay unit 18A can dip directly into the tank 16A. Otherwise, the operation of the delay units 34 and 18A is identical with that of the delay units 17, 18 or of the delay unit 17A.

The mounting of the accumulator 13A directly in the cylinder 20A of the delay unit 34 brings about substantial savings in space. The accumulator 13A is preferably of the type having a piston or ram 13a one side of which is adjacent to a plenum chamber 13b and the other side of which in contact with a supply of pressurized hydraulic fluid furnished by the pump 12. The pressurized fluid fills a chamber 203A corresponding to the chamber 203 of FIG. 2. It will be seen that the entire accumulator 13A is installed in the cylinder 20A of the delay unit 34 at that side of the piston 22 which faces away from the piston rod 24.

Figure 7:
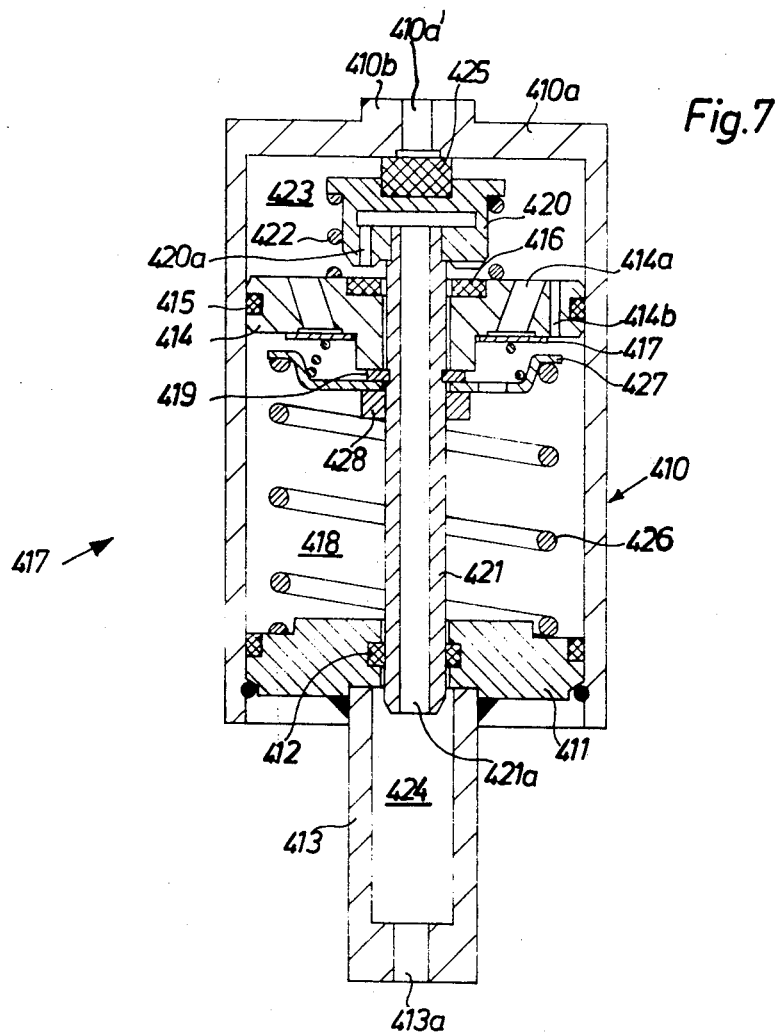
FIG. 7 is an axial sectional view of a delay unit which constitutes a further modification of the delay units shown in FIGS. 1 to 6.
Figure 8:
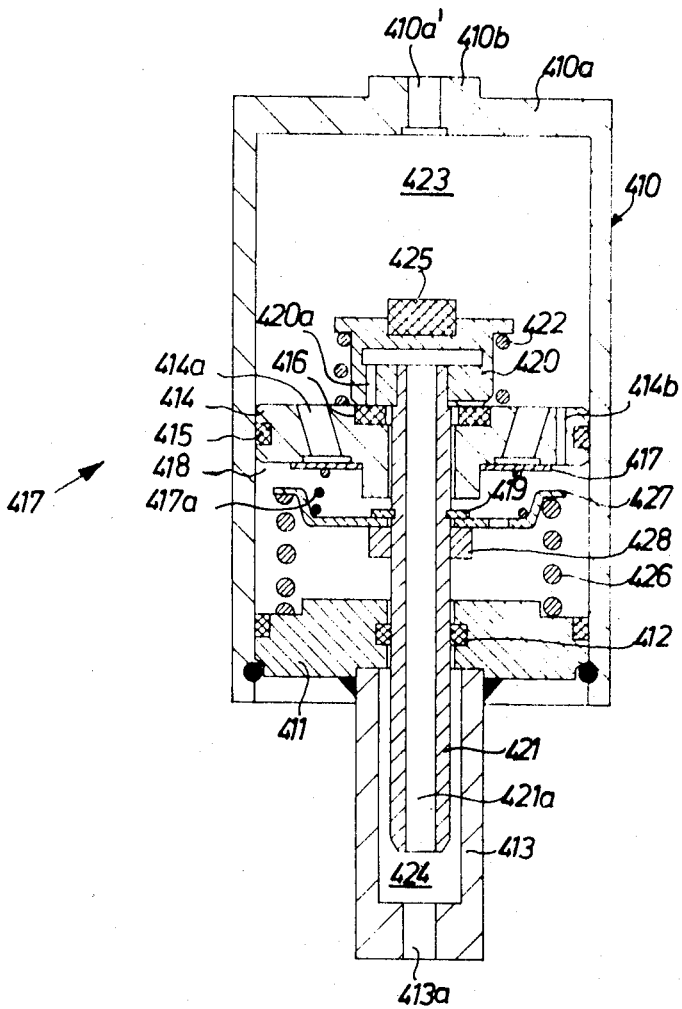
FIG. 8 illustrates the structure of FIG. 7 but with the piston and piston rod of the delay unit in a different axial position.

Referring to FIGS. 7 and 8, there is shown a delay unit 417 which comprises a cylinder 410 having a bottom wall or end wall 410a at one end and a removable cover 411 at other end. The end wall 410a as a centrally located hollow nipple 410b and the cover 411 has a centrally located bore for a piston rod 421 which is surrounded by a sealing element 412. The cylindrical extension 413 of the cover 411 defines a compartment 424 and has at its free end a bore 413a which establishes communication between the compartment 424 and the interior of the conduit 14 (not shown in FIGS. 7 and 8).

A piston 414 is slidably received in and divides the interior of the cylinder 410 into two chambers 418, 423. The peripheral surface of the piston 414 is provided with a circumferential groove for a sealing ring 415. The piston 414 is further provided with a seal 416 and with an annulus of bores 414a which permit hydraulic fluid to flow from the chamber 423 into the chamber 418 in response to opening of a disk-shaped valve plate 417 mounted in the chamber 418 and biased against the respective side of the piston 414 by a helical spring 417a which reacts against a cupped retainer 427. Still further, the piston 414 is provided with a flow restricting passage 414b which permits the fluid to flow between the chambers 418, 423 at all times. The piston 414 is slidable, within limits with reference to the piston rod 421 the upper end of which carries a valve member 420. The extent of axial movement of the piston 414 with reference to the piston rod 421 or vice versa is determined by the distance between the valve member 420 and a split ring 419 which extends into a circumferential groove of the piston rod and constitutes an abutment for the retainer 427. A portion of the piston rod 421 is preferably provided with external threads to mesh with a nut 428 which constitutes a distancing element in that if determines the extent of axial movement of the piston rod 421 toward the bore 413a.

When the delay unit 417 of FIGS. 7 and 8 is not in operation, the piston 414 is biased against the split ring 419 by a helical spring 422 which reacts against the valve member 420. The axial bore 421a of the piston rod 421 then establishes a path between the compartment 424 and the chamber 423 by way of a port 420a which is machined into the valve member 420 and is open to the chamber 423 when the valve member 420 is lifted off the seat 416 of the piston 414. A strong helical spring 426 in the chamber 418 reacts against the cover 411 and urges a sealing element 425 on the valve member 420 against the adjacent enlarged end of an opening 410a' in the nipple 410b of the end wall 410a. The upper end convolution of the spring 426 bears against the retainer 427 which is held against axial movement with reference to the piston rod 421 and valve member 420 by the split ring 419 and distancing element 428. The movement of the piston rod 421 into the compartment 424 is terminated when the distancing element 428 comes into abutment with the cover 411. As mentioned before, the delay unit 417 is assumed to perform the same function as the unit 17 of FIG. 1 or the unit 34 of FIG. 6; therefore, the nipple 410b is connected with the outlet of the pump and with the accumulator, and the cylindrical extension 413 is connected with the high-pressure conduit (14 in FIG. 1) which can admit pressurized hydraulic fluid into the inlet or inlets of the piston rod or piston rods of one or more self-levelling struts such as the struts 10 of FIG. 1. The delay unit 417 can be used in combination with the delay unit 18, 18A or with a delay unit of the type shown in FIG. 5. If the other delay unit is identical with the delay unit 417 and is to replace the delay unit 18 of FIG. 1, its nipple 410b is connected with the return conduit 15 and its extension 413 can discharge hydraulic fluid into the source or tank 16.

It is now assumed that the delay unit 417 of FIGS. 7 and 8 is used as a substitute for the delay unit 17 of FIG. 1. When one of the piston rods 105 penetrates into the respective housing 10a beyond its neutral or normal position, the pressure in the compartment 424 of the delay unit 417 corresponds to that of compressed gas in the plenum chamber 103. Since the pressure in the accumulator 13 exceeds the pressure in the plenum chamber 103 in the neutral position of the piston rod 105, the pressure in the chamber 423 exceeds the pressure in the compartment 424 and the piston rod 421 penetrates into the compartment 424 without any damping action and with simultaneous stressing of the spring 422. The valve member 420 is thereby moved into sealing engagement with the seat 416 of the piston 414 (see FIG. 8) to seal the respective end of the port 420a. The hydraulic fluid then flows from the chamber 418 through the constant-diameter flow-restricting passage 414b and into the chamber 423 whereby the fluid in the chamber 418 builds up a damping or retarding pressure which opposes the movement of the piston rod 421 into the compartment 424. Such movement is shared by the piston 414 and is accompanied by a stressing of the spring 426. The axial movement of the piston rod 421 and piston 414 in a direction away from the end wall 410a of the cylinder 410 is terminated when the distancing element 428 moves into abutment with the cover 411.

When the piston rod 421 dwells in that end position in which the distancing element 428 engages the cover 411, the passage 414b insures an equalization of pressures in the chambers 418 and 423 whereby the spring 422 is free to expand and to move the piston 414 into abutment with the split ring 419. This establishes a path for the flow of pressurized hydraulic fluid from the accumulator 13, through the chamber 423, port 420a, bore 421a of the piston rod 421, compartment 424 and into the inlet or inlets of one or both piston rods 105. The flow of pressurized hydraulic fluid into one or both struts 10 is terminated when the respective piston rod or piston rods 105 return to their neutral positions. The respective valve or valves 101 are then free to close and the pressure in the compartment 424 of the delay unit 417 rises to that in the accumulator 13. In such condition of the delay unit 417, the spring 426 brings about a difference between the fluid pressure in the chamber 418 and the fluid pressure in the chamber 423 so that the spring 426 expands and the valve plate 417 is caused to move to its open position against the opposition of the spring 417a. Consequently, the piston rod 421 is free to rapidly return to the position shown in FIG. 7 because the bores 414a allow for practically unimpeded flow of hydraulic fluid between the chambers 418 and 423. As the piston rod 421 moves back to the starting position of FIG. 7, its lower end portion is being withdrawn from the compartment 424 and the latter receives an equal volume of hydraulic fluid from the chamber 423 by way of the port 420a and bore 421a.

If one or both piston rods 105 are moved inwardly beyond their neutral positions for relatively short intervals of time, the damped movement of the hollow piston rod 421 into the compartment 424 starts with the opening of one or both regulating valves 101 and continues as long as the valve or valves 101 remain open. The piston rod 421 rapidly returns to the position of FIG. 7 without any appreciable damping of its movement in response to closing of both valves 101 i.e., as soon as each of these valves is closed.

The provision of the spring 422 necessitates the establishment of a certain minimum pressure differential between the interior of the accumulator 13 and the interior of the strut or struts 10 as well as between the interior of the accumulator 13 and the interior of the strut or struts 10 as well as between the interior of the strut or struts 10 and the tank 16. When the vehicle which embodies the arrangement of FIG. 1 with two delay units of the type shown in FIGS. 7 and 8 travels in a curve and is under maximum load, the pressure in the struts 10 can equal or even exceeds the pressure in the accumulator 13. In order to prevent, under such circumstances, that the path including the port 420a and the bore 421a remains open when the pressure differential is too small to maintain the valve member 420 in sealing engagement with the seat 416, the force of the spring 426 and the cross-sectional area of the enlarged lower end portion of the opening 410a' in the end wall 410a are selected in such a way that the opening 410a' is then sealed by the element 425 of the valve member 420 to prevent entry of pressurized hydraulic fluid into the chamber 423.

Figure 9:
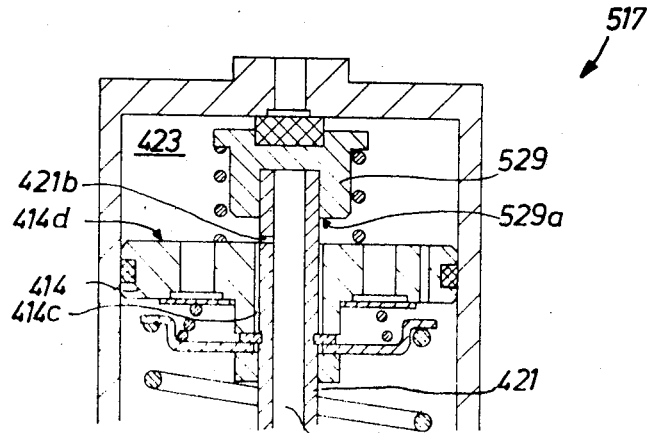
FIG. 9 is a fragmentary axial sectional view of a delay unit which constitutes a first modification of the delay unit shown in FIGS. 7 and 8.

In the delay unit 517 of FIG. 9, the valve member 420 of FIGS. 7 and 8 is replaced with a distancing element 529 which limits the extent of upward movement of the piston 414 and is fixedly secured to the respective end of the hollow piston rod 421. The latter is provided with a radial port 421b which communicates with the axial bore 421a and can communicate with the chamber 423. When the delay unit 517 of FIG. 9 is in operation, the surface 529a of the distancing element 529 abuts against the upper side 414d of the piston 414 to thus seal the port 421b from the chamber 423 and from the central bore 414c of the piston 414. The bore 414c is dimensioned in such a way that the piston 414 surrounds the piston rod 421 with a certain amount of clearance.

Figure 10:
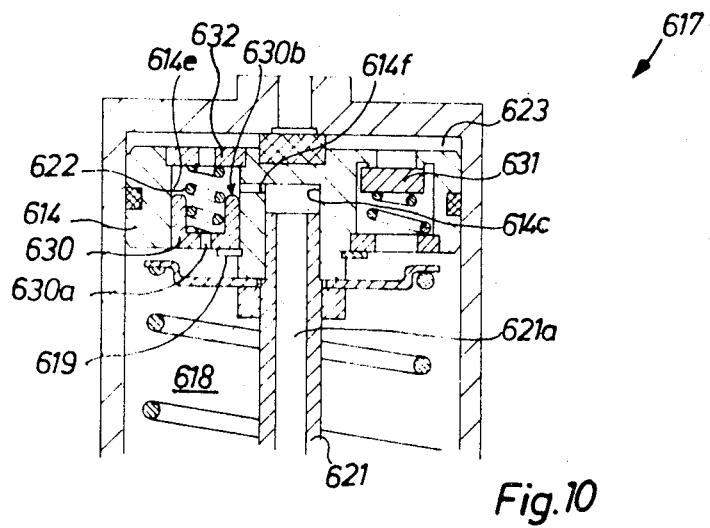
FIG. 10 is a fragmentary axial sectional view of a delay unit which constitutes a second modification of the delay unit shown in FIGS. 7 and 8.

The delay unit 617 of FIG. 10 has a piston 614 which is fixedly secured to a hollow piston rod 621. A control plunger 630 is slidable in a passage 614e of the piston 614 and is biased by a spring 622 so that it normally abuts against the split ring 619. The control plunger 630 has a flow restricting orifice 630a of constant diameter. The piston 614 has a centrally located bore 614c which communicates with the passage 614e by way of a channel 614f. The central bore 614c is in communication with the axial bore 621a of the piston rod 621. The piston 614 is further provided with an eccentrically mounted one-way valve 631 which permits hydraulic fluid to flow from the chamber 623 into the chamber 618 in response to increasing fluid pressure in the chamber 623.

When the delay unit 617 of FIG. 10 is in operation and the damping pressure in the chamber 618 rises, the control plunger 630 is displaced against the resistance of the spring 622 to such an extent that the peripheral surface of the plunger 630 seals the channel 614f from the passage 614e. The end face 630b of the control plunger 630 then abuts against a stop 632 in the piston 614 while the chamber 623 remains sealed from the axial bore 621a so that the latter cannot convey pressurized fluid into the compartment (corresponding to that numbered 302 in FIG. 2).

The remaining (non-illustrated) parts of the delay units 517, 617 shown in FIGS. 9 and 10 are preferably identical with those of the delay unit 417 shown in FIGS. 7 and 8 or of the delay unit 17 shown in FIGS. 2–4. It is clear that each of the delay units 517, 617 can be used as a substitute for the delay unit 18 of FIG. 1 or for the delay unit 18A of FIG. 6.

An important advantage of the delay units 417, 517, 617 shown in FIGS. 7 to 10 is that the fluid can flow into a strut or from a strut shortly before the piston of the respective delay unit reaches its end position. Thus, and referring to FIGS. 7–8, the delay unit 417 will permit pressurized fluid to flow from the compartment 424 into the inlet of the piston rod or piston rods 105 of one or more struts 10 shortly before the piston 414 reaches its lower end position. The same holds true for the piston in the associated second delay unit which replaces the delay unit 18 of FIG. 1 and is constructed in the same way as the delay unit 417. The piston 414 of such second delay unit is in motion toward the end position in which it is remote from the end wall 420 when the respective compartment 424 can admit fluid from the outlet or outlets 107 of one or more struts 10 into the tank 16.

If the movable portion 105 or 10a of a strut is shifted for a short interval to such an extent that the shock absorbing arrangement should initiate its return movement of the neutral position, and if the movable portion thereupon returns to its neutral position, the quantity of hydraulic fluid which is displaced in the strut owing to such movement of the movable portion 105 or 10a must be replaced in response to opening of the valve 26 or 32 shown in FIGS. 2–5. The valve 26 or 32 of each of the structures shown in FIGS. 2–5 performs (during damped movement of the piston 22) two functions, namely, to seal the chamber 204 from the chamber 203 and to seal the port 224 or 225 from the chamber 204. The valve 26 or 32 is therefore likely to "stick" to the respective side of the piston 22 and to thus prevent rapid return movement of the piston 22 to its starting position. Also, the seats for the valve 26 or 32 must be machined with a high degree of precision.

Each of the delay units 417, 517, 617 constitutes a substantial simplification of the delay units shown in FIGS. 2–5 and insures rapid and unimpeded return movement of the piston to its starting position. The delay units 417, 517, 617 rely on the buildup of damping pressure in the chamber 418 or 618 and employ a piston (414) which is movable with reference to the piston rod (FIGS. 7–9) or a piston which is provided with an axially movable control plunger 630 (FIG. 10). The piston 414 or the plunger 630 can seal the path for the flow of fluid between the chamber 418 or 618 and the axial bore of the piston rod. The path for the flow of fluid is opened when the piston dwells in its starting position (see FIGS. 7, 9 and 10); such opening is due to a drop of fluid pressure in the chamber 418 or 618 and to the action of the spring 426.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A shock absorbing arrangement, particularly for automotive vehicles, comprising a source of hydraulic fluid; pressurinzing means arranged to draw fluid from said source and to pressurize the same; at least one self-levelling strut having a movable portion movable from a neutral position to several first and second positions to thus respectively reduce and increase the length of said strut; first and second conduit means for respectively conveying pressurized fluid from said pressurinzing means to said strut to thus effect a return movement of said movable portion from one of said first positions to said neutral position and for conveying fluid from said strut to said source in response to movement of said movable portion from one of said second positions to said neutral position; and first and second delay units respectively installed in said first and second conduit means and being respectively operative to determine the delay with which said movable portion returns to said neutral position from one of said first positions by controlling the fluid flow in said first conduit means and to determine the delay with which said movable portion returns to said neutral position from one of said second positions by controlling the fluid flow in said second conduit means.

2. A hydropneumatic shock absorbing arrangement as defined in claim 1, wherein said pressurizing means comprises at least one accumulator for pressurized hydraulic fluid and said strut is a self-levelling hydropneumatic strut.

3. A shock absorbing arrangement as defined in claim 1, wherein each of said delay units comprises a cylinder having a first chamber and a second chamber, a piston reciprocable in said cylinder between said chambers and having a plurality of bores each extending between said chambers, a hollow piston rod connected with said piston in said second chamber and movable beyond said cylinder, first biasing means for urging said piston in a direction to reduce the volume of said first chamber, first valve means movable from a sealing position to an open position to thereby permit the flow of fluid from said first chamber into said second chamber by way of said bores, second valve means mounted on said piston rod and movable from a sealing position to an open position in response to movement of said piston in a direction to reduce the volume of said second chamber, said piston having first port means which establishes a path for the flow of fluid between the interior of said hollow piston rod and said second chamber in the open position of said first valve means and said piston rod having second port means which establishes a path for the flow of fluid between said second chamber and the interior of said piston rod in the open position of said second valve means, second biasing means for urging said first and second valve means to said sealing positions thereof, said cylinder having cover means remote from said first chamber and provided with a compartment communicating with the interior of said piston rod, said first chambers of said first and second delay units being respectively connected with said pressurizing means and an outlet of said strut and said compartments of said first and second delay units being respectively connected with an inlet of said strut and with said source.

4. An arrangement as defined in claim 3, wherein each of said pistons is further provided with a passage extending between the respective first and second chambers and each of said second valve means comprises a bell-shaped valve member, each of said first valve means comprising a valve plate adjacent to the respective piston in the second chamber of the respective cylinder, said cylinders further having hollow nipples communicating with the respective first chambers, the nipple of said first delay unit being connected with said pressurizing means and the nipple of said second delay unit being connected with the outlet of said strut.

5. An arrangement as defined in claim 3, wherein said cover means are provided with hollow extension which define said compartments, said piston rods extending through the respective cover means and into the respective extensions, each of said extensions having a hollow nipple and the nipples of said first and second delay units being respectively connected with the inlet of said strut and with said source.

6. An arrangement as defined in claim 3, wherein each of said first valve means comprises a first portion extending radially of the respective piston rod and arranged to seal said bores of the respective piston in the sealing position of said first valve means and a second portion extending axially of the respective piston rod and arranged to seal said first port means in the sealing position of said first valve means.

7. An arrangement as defined in claim 1, further comprising one-way valve means provided in said second conduit means between said second delay unit and said source and arranged to open and to thus permit the flow of fluid from said second delay unit into said source in response to a predetermined pressure of fluid.

8. An arrangement as defined in claim 7, wherein said one-way valve means is adjustable to select said predetermined pressure.

9. An arrangement as defined in claim 3, wherein each of said pistons is further provided with a passage extending between the respective first and second chambers, and further comprising one-way valve means arranged to permit the flow of fluid between the respective first and second chambers by way of said passage when the fluid pressure in said second chambers exceeds the fluid pressure in the respective first chambers.

10. An arrangement as defined in claim 9, wherein said passages have flow-restricting portions.

11. An arrangement as defined in claim 1, further comprising one-way valve means installed in said second conduit means between said second delay unit and said strut to prevent the flow of hydraulic fluid to said strut by way of said second conduit means.

12. An arrangement as defined in claim 1, wherein said pressurizing means comprises an accumulator for hydraulic fluid, said accumulator being incorporated into said first delay unit.

13. An arrangement as defined in claim 1, wherein said second delay unit is mounted on said source.

14. An arrangement as defined in claim 1, wherein each of said delay units comprises a cylinder having first and second chambers, a piston reciprocably mounted in said cylinder between said chambers, a compartment provided in said cylinder, a hollow piston rod reciprocably mounted with reference to said cylinder and said piston and having an open end portion extending into and communicating with said compartment and port means in communication with said compartment, and valve means for sealing said port means from said first chamber in a first axial position of said piston with reference to said piston rod and for permitting the flow of fluid between said compartment and said first chamber by way of said port means and said hollow piston rod in a second axial position of said piston with reference to said piston rod, the pressure in said second chamber rising when the respective delay unit is in operation to thereby effect a relative movement between said piston and said piston rod in a first direction, and means for biasing said piston and said piston rod to perform a relative movement in a second direction, the first chamber and the compartment of said first delay unit being respectively connected with said pressurizing means and an inlet of said strut and the first chamber and the compartment of said second delay unit being respectively connected with an outlet of said strut and with said source.

15. An arrangement as defined in claim 14, wherein said valve means is provided on said piston rod and engages said piston in the sealing position thereof.

16. An arrangement as defined in claim 15, wherein said port means extends radially of said piston rod.

17. An arrangement as defined in claim 16, wherein said piston has a central bore surrounding with clearance a portion of said piston rod and communicating with said port means in the sealing position of said valve means.

18. An arrangement as defined in claim 14, wherein each of said port means constitutes a flow restrictor for the fluid flowing therethrough when the respective delay unit is in operation.

19. An arrangement as defined in claim 14, wherein each of said piston rods is provided with a sealing device located in the respective first chamber and each of said cylinders has an opening through which the first chamber of said first delay unit communicates with said pressurizing means and the first chamber of said second delay unit communicates with the outlet of said strut, and further comprising second biasing means for urging said sealing devices against the respective openings.

20. An arrangement as defined in claim 19, wherein said sealing devices are arranged to move away from the respective openings in response to a pressure in the respective cylinder which suffices to move the piston rod against the opposition of the respective second biasing means.

21. An arrangement as defined in claim 1, wherein each of said delay units comprises a cylinder having first and second chambers, a piston reciprocably received in said cylinder between said chambers, a piston rod secured to said piston, a compartment provided in said cylinder and communicating with the interior of said piston rod, said piston rod having a bore communicating with said compartment and said piston having a passage and a spring-biased plunger provided in said passage to normally seal said bore from said first chamber, the pressure in said second chamber exceeding the pressure in said first chamber to thereby maintain said plunger means in a sealing position when the respective delay unit is in operation, the first chamber and the compartment of said first delay unit being respectively connected with said pressurizing means and with an inlet of said strut and the first chamber and the compartment of said second delay unit being respectively connected with an outlet of said strut and with said source.

22. An arrangement as defined in claim 21, wherein each of said bores is arranged to communicate with the respective first chamber by way of the respective passage, said plunger means having an end face which abuts against a stop provided in said piston in the sealing position of said plunger means.

* * * * *